Dec. 8, 1936.     F. MERTINZ     2,063,179
CUTTING DIE
Filed July 26, 1934     2 Sheets—Sheet 1
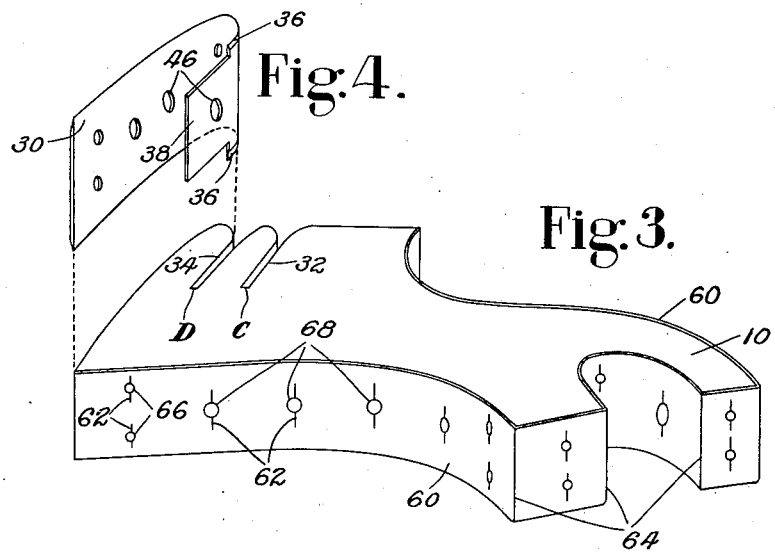
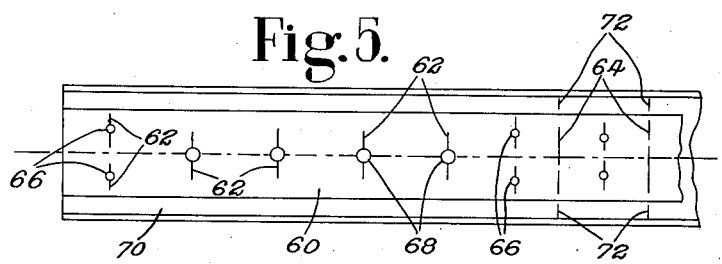
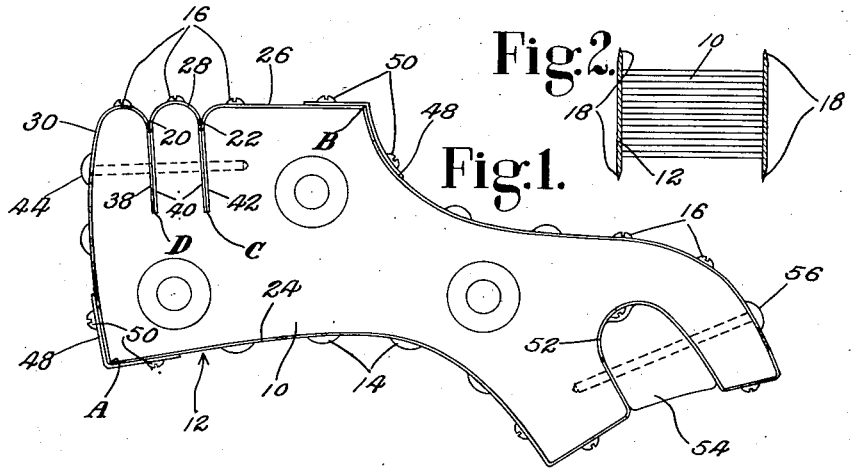
INVENTOR
Franz Mertinz
By Vernon E. Hodges
Asa. Alter Dec. 8, 1936.  F. MERTINZ  2,063,179
CUTTING DIE
Filed July 26, 1934  2 Sheets-Sheet 2
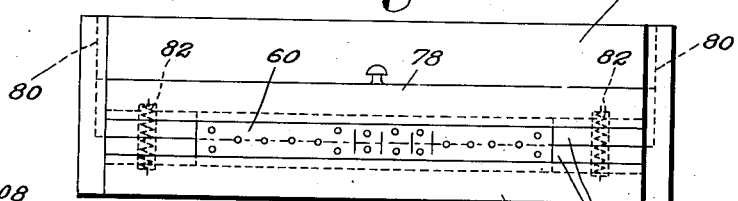
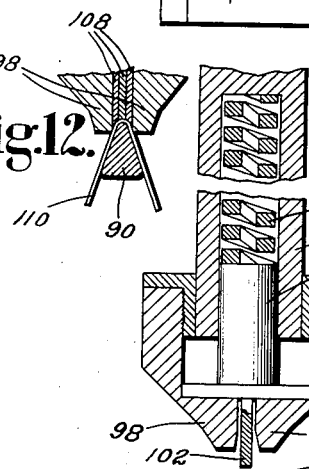
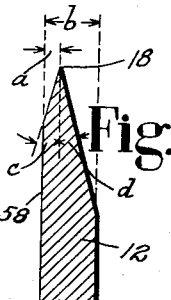
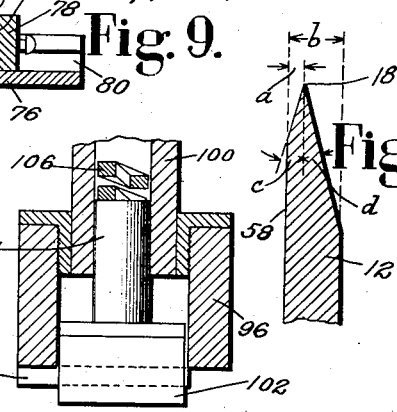
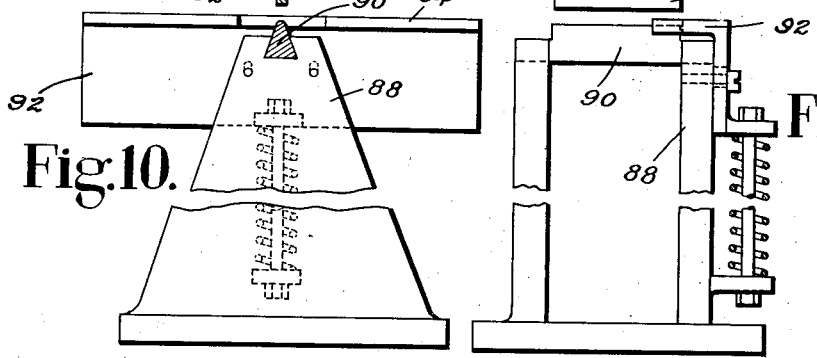
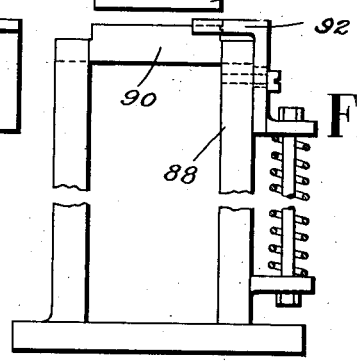
INVENTOR
Franz Mertinz
By Vernon E. Hodges
Asso. Atty.

Patented Dec. 8, 1936

2,063,179

UNITED STATES PATENT OFFICE 2,063,179

CUTTING DIE

Franz Mertinz, Vienna, Austria, assignor to United Shoe Machinery Corporation, Paterson, N. J., a corporation of New Jersey Application July 26, 1934, Serial No. 737,113
In Austria July 28, 1933

2 Claims. (Cl. 164—29)

This invention relates to cutting dies and methods of and apparatus for producing the same, and is herein illustrated in connection with a cutting die for producing shoe part blanks from leather or other sheet material.

One type of die which has come into use for producing shoe part blanks is illustrated in United States Letters Patent No. 1,738,599, granted December 10, 1929, upon an application filed in the name of the present applicant, and which discloses a die having a core corresponding in shape to the outline of the shoe part blank to be produced and a cutting blade bent along the periphery of the core and secured thereto, the blade having upper and lower cutting edges so that the die can be used to produce either right or left blanks of similar outline.

It is an object of the present invention to provide an improved die construction of the type referred to which is especially adapted for use in producing blanks having sharply reentrant portions. To this end and as shown, the invention provides a die comprising a core having reentrant edge portions, a blade having cutting edge portions extending along edge portions of the core and a member extending into the reentrant portions of the core, and means extending through the blade, member, and core to secure the blade to the core.

Other features of the invention will be apparent from the following detailed description, when taken in connection with the accompanying drawings, and will be pointed out in the claims.

In the drawings,

Fig. 1 is a plan view of a die constructed in accordance with one embodiment of the invention;

Fig. 2 illustrates a cross-section through a portion of the die;

Fig. 3 is a perspective view of a core with a flexible strip applied thereto;

Fig. 4 is a perspective view of a portion of a blade to be attached to the core;

Fig. 5 is a plan view of a piece of blade stock with a flexible strip applied thereto;

Fig. 6 is a cross-sectional view of a portion of the cutting edge of the die;

Fig. 7 is a cross-section through an auxiliary device for practicing the method;

Fig. 8 is a plan view of the device;

Fig. 9 is a transverse cross-section of the device;

Fig. 10 is a front view, partly in section, of a blade bending device for carrying out the method of the invention;

Fig. 11 is a side elevation, partly in section, of the die bending means, and

Fig. 12 is a detailed view of a modified form of the die bending means.

The die illustrated by way of example in Figs. 1 and 2 is a die for cutting a shoe part blank such as a quarter, and comprises a core 10, and a cutting blade 12 secured to the core by rivets 14 and screws 16. The cutting blade extends along the periphery of the core and has marginal portions which project beyond the faces of the core upon opposite sides thereof and terminate in cutting edges 18 operable to cut from sheet material either left or right blanks of similar outline.

The core 10 is preferably formed from laminated wood stock sawed out or otherwise shaped to correspond in outline closely to that of a blank to be produced by the die.

The cutting blade 12 is preferably formed from thin flat steel stock which can be bent readily to conform to the shape of the core. When the contour of the core is simple, a blade in one piece will suffice. However, where the core has sharply reentrant portions, such as indicated at 20 and 22, Fig. 1, which do not provide sufficient space for attaching screws, it has been found preferable to form the blade in several pieces. To this end the cutting blade 12 is composed of four parts 24, 26, 28 and 30 which extend respectively from A to B, B to C, C to D and D to A; C and D being points at the ends of slots 32 and 34 in the core extending inwardly from the reentrant portions 20 and 22. As best shown in Figs. 1 and 3, the blade part 30 has cutting edges 36 which terminate at the point 26, the end portion 38 of the blade beyond that point being of the same height as the thickness of the core 10 and being positioned in the slot 34. Similarly, the blade part 28 has end portions 40 positioned in the slots 32 and 34, and the blade part 26 has an end portion 42 positioned in slot 32. The end portions of the blades are securely held in place by a rivet 44 which passes through the core, openings 46 in blade part 30, and similar openings in blade parts 28 and 26. Abutting edge portions of blade parts 24 and 26 at B and of blade parts 30 and 24 at A are secured together by corner plates 48 fastened to the core by screws 50.

In order to provide support for the cutting blade along inwardly curved portions thereof such as at point 52, use is made of an auxiliary core member 54 of the same thickness as the core 10, and held in position by a rivet 56 extending through the blade core 10 and member 54.

Preferably and as shown in Fig. 6, the edge portions 18 of the blade are ground so that the cutting edge is positioned at a distance of from ¼ to ⅓ of the entire thickness of the blade from the plane of the inner wall 58. As shown in the figure, the distance $a$ from the cutting edge to the inner wall 58 is about ¼ of the distance $b$, the thickness of the blade, and the angle $c$ equals the angle $d$, that is, in cross-section, beveled portions of the blade in back of the cutting edge are symmetrically disposed relatively to a vertical plane through the cutting edge. It has been found that blades of this construction possess the advantage of greater resistance against bending and breaking of the cutting edge as compared with blades in which the cutting edges are arranged in the plane of the side wall. This is apparently due to the fact that the cutting edges in the illustrated blade are backed by material upon both sides thereof. When using a blade constructed as above described, it has been found preferable to reduce the size of the core along its periphery by an amount equal to the distance $a$ so that the blank to be cut out will be of the desired size.

In the manufacture of dies of the type above described, after providing a core 10 corresponding in outline to the outline of a blank to be produced, in fitting the blade parts 24, 26, 28 and 30 to the core, use is made of templates in the form of flexible strips of paper 60 (Fig. 3) of a width equal to the thickness of the core, and of lengths corresponding to the lengths of the blade parts. The strips are detachably secured by adhesive to the core after which lines 62 substantially equally spaced along the core are marked upon the strips to indicate the locations of the holes to be drilled in the core for insertion of the rivets and screws for attaching the blade parts. Lines 64 indicating the corners are also marked upon the strips. Holes such as holes 66 and 68 for the blade attaching screws and rivets are then drilled through the strips and into the core along the marked lines 62. Preferably, these holes are somewhat smaller than the diameters of the attaching members so that the latter will tightly engage the core when they are in position. Each strip 60 is then removed from the core and is separately secured by adhesive to a piece of blade stock such as blade stock 70 (Fig. 5). The marks of the strip are then transferred to the blade stock, preferably by center punching through the holes 66 and 68 and by prolonging the lines 64 as indicated by reference character 72.

Since the blade should extend beyond the upper and lower surfaces of the core by equal amounts, it is necessary that the longitudinal median line of the blade coincides with that of the strip, as illustrated in Fig. 3. To accomplish this, use is made of an auxiliary device, illustrated in Figs. 7, 8 and 9. This device comprises a bar 74 having a flat laterally extending portion 76 upon which is mounted a bar 78 arranged for sliding movement in guideways 80. The bar 78 is normally urged toward the body portion of the bar 74 by springs 82. The bars are provided with blade supporting surfaces 84 and flanges 86 which overlie the surfaces by a distance corresponding to the distance which the edge of the blade should project beyond the core. Thus when a blade is clamped in the position between the bars, the portion thereof which is exposed corresponds to the thickness of the core, and a strip 60 of that width positioned between the flanges will be properly located relatively to the edges of the blade. This device provides convenient means for centering the strip upon the blade with the assurance that the marginal portions of the blade will extend equal amounts from opposite faces of the core when the blade is attached thereto.

Instead of drilling the holes for the fastenings through the strip and the core, as an alternative, the locations of the holes may be first marked upon the core, then the holes may be drilled therein and, after applying the strips to the core, the locations of the holes may be indicated upon the strips in any suitable manner, such as by puncturing the strips at the holes. This method is particularly suitable for repair purposes, in which case the core is already provided with holes for the fastenings which may also be used in attaching a new or repaired knife blade to the core. After the holes are formed in the strips, their locations may be transferred to the blade stock in the usual manner.

In either case, after the blade stock is suitably marked as above described, the strip 60 is removed and the various holes for the blade attaching devices are drilled, a similar process being carried out for each of the blade parts.

In the next operation the blade parts are placed in a press and bent into conformity with the core making use of the marks 64 in forming the corners or other sharp bends.

In bending the cutting blade to fit the corners of the case, there is a tendency for the blade to break easily since the outer layer of fibers of the blade are overtensioned. To overcome this, means is provided for exerting pressure upon the blade at the points where it is to be bent during the bending operation. The apparatus for accomplishing this comprises a support 88 carrying an abutment 90 which is arranged to engage the under side of the blade to be bent. Since, as a rule, the line along which the bending is to be executed should be vertical to the longitudinal axis of the blade, the supporting member 88 is provided with a resiliently mounted gage bar 92, the edge 94 of which is arranged vertically of the lower die and serves for positioning the blade. The head 96 of the device is provided with two bending members 98 carried at the lower end of a spindle 100. Between the bending members there is arranged a yieldable clamping jaw 102 which is carried by a plunger 104 in the head 96 and is forced downwardly by a strong spring 106 in the spindle 100. The clamping jaw is arranged vertically above the lower die 90 and may recede between the bending members against the resistance of the spring. As the spindle is moved downwardly, the cutting blade is engaged first by the clamping jaw 102, which upon continued downward movement, is pushed upwardly against the resistance of the spring 106 thereby clamping the blade between the members 90 and 102. The bending operation begins upon the engagement of the blade by the bending members 98. In order to produce a very pronounced bend, the bending members are moved downwardly a considerable distance and the clamping pressure against the blade is correspondingly increased. When producing very sharp bends, it is advantageous to employ several spring-pressed jaws, such as illustrated in Fig. 12 in which three clamping jaws 108 are shown operating upon a piece of blade stock 110.

After the blade parts 24, 26, 28 and 30 have been bent into conformity with the periphery of the core 10, they are attached to the core by the screws 16 and the rivets 14, 44 and 46 which are inserted through corresponding alined openings in the blade parts and core. The corner plates 48 are then secured in position by screws 50 thus completing the die. The use of the method outlined insures the production of dies of rigid construction wherein both cutting edge portions of the cutting blade closely conform to a predetermined shape of blank to be produced.

Having described the invention, what is claimed as new and is desired to be secured by Letters Patent of the United States is:

1. A cutting die comprising a core corresponding in outline to the outline of a blank to be produced and having a reentrant portion and a slot extending inwardly from the reentrant portion, and a cutting blade extending along the periphery of the core and having an edge portion projecting beyond a face of the core and an end portion corresponding in width to the thickness of the core positioned in the slot with edge portions of said end portion substantially flush with the faces of the core.

2. A cutting die comprising a core having a reentrant portion along its periphery, a cutting blade extending along the periphery of the core, an auxiliary core member located within the reentrant portion of the core and separated completely from the core by the blade, and means extending through portions of the blade, core and auxiliary core member for securing the blade in rigid position.

FRANZ MERTINZ.